(12) United States Patent
Nakayama et al.

(10) Patent No.: US 7,891,746 B2
(45) Date of Patent: Feb. 22, 2011

(54) BRAKING DEVICE FOR MOTORCYCLE

(75) Inventors: Masanobu Nakayama, Saitama (JP); Kazuya Takenouchi, Saitama (JP); Kuzihiko Tani, Saitama (JP); Masaie Kato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1110 days.

(21) Appl. No.: 11/300,336

(22) Filed: Dec. 15, 2005

(65) Prior Publication Data

US 2006/0131951 A1 Jun. 22, 2006

(30) Foreign Application Priority Data

Dec. 20, 2004 (JP) .............................. 2004-368049
Dec. 27, 2004 (JP) .............................. 2004-376278

(51) Int. Cl.
*B60T 13/00* (2006.01)

(52) U.S. Cl. ................................... 303/9.64
(58) Field of Classification Search ................ 303/9.64
See application file for complete search history.

(56) References Cited

U.S. PATENT DOCUMENTS

| | | | |
|---|---|---|---|
| 5,344,220 A | | 9/1994 | Roll et al. |
| 5,386,366 A | * | 1/1995 | Roll et al. ................... 701/70 |
| 5,416,708 A | * | 5/1995 | Matsuto et al. .............. 701/71 |
| 5,577,816 A | * | 11/1996 | Suzuki et al. ............... 303/174 |
| 5,803,557 A | * | 9/1998 | Horiuchi et al. ............ 303/173 |
| 5,934,771 A | * | 8/1999 | Ishikawa et al. ........... 303/163 |
| 6,062,660 A | * | 5/2000 | Matsuno et al. ............ 303/173 |
| 6,443,540 B2 | * | 9/2002 | Shimizu et al. ............ 303/177 |
| 6,443,541 B1 | * | 9/2002 | Aizawa ...................... 303/186 |
| 6,572,200 B2 | * | 6/2003 | Soga et al. .................. 303/3 |
| 6,601,927 B2 | * | 8/2003 | Sakamoto ................... 303/137 |
| 7,234,784 B2 | * | 6/2007 | Tani et al. .................. 303/9.64 |
| 2002/0125764 A1 | * | 9/2002 | Sakamoto .................. 303/9.63 |

FOREIGN PATENT DOCUMENTS

| | | | |
|---|---|---|---|
| DE | 41 28 085 A1 | | 2/1993 |
| DE | 4128085 A1 | * | 2/1993 |
| DE | 103 43 985 A1 | | 4/2004 |
| DE | 10343985 A1 | * | 4/2004 |
| EP | 0 533 436 A2 | | 3/1993 |
| EP | 1671863 A2 | | 6/2006 |
| JP | 4-368267 A | | 12/1992 |
| JP | 2001-219833 A | | 8/2001 |
| JP | 2001-310717 A | | 11/2001 |
| JP | 2004-330876 A | | 11/2004 |

* cited by examiner

*Primary Examiner*—Bradley T King
*Assistant Examiner*—James K Hsiao
(74) *Attorney, Agent, or Firm*—Birch, Stewart, Kolasch & Birch, LLP

(57) ABSTRACT

A braking device for a motorcycle for controlling a sudden increase in the braking force caused by a time lag from the time the amount of operation of a brake operating portion is detected until a change in hydraulic pressure of wheel braking means for improving the feel of braking. An input-side pressure sensor detects a master cylinder pressure and a hydraulic modulator creates a hydraulic pressure to be exerted on a brake caliper. A controller is provided for controlling the hydraulic pressure created by the hydraulic modulator in accordance with a detected signal provided from the input-side pressure sensor. In accordance with a change in the quantity per unit time of the detected signal provided from the input-side pressure sensor the controller limits a change speed of the hydraulic pressure created by the hydraulic modulator.

22 Claims, 6 Drawing Sheets

MAP 1

| fmp (MPa/ループ) | A |
|---|---|
| 0〜0.1 | $A_1$ |
| 0.1〜0.2 | $A_2$ |
| 0.2〜0.5 | $A_3$ |
| 0.5以上 | $A_4$ | fmp (MPa/LOOP)

1 LOOP = 3.3 msec

BRAKING DEVICE FOR MOTORCYCLE

CROSS-REFERENCE TO RELATED APPLICATIONS

The present application claims priority under 35 USC 119 to Japanese Patent Application No. 2004-376278 filed on Dec. 27, 2004 and Japanese Patent Application No. 2004-368049 filed on Dec. 20, 2004 the entire contents of which are hereby incorporated by reference.

FIELD OF THE INVENTION

The present invention relates to a braking device for a motorcycle and more particularly to a braking device of a so-called brake by wire type.

DESCRIPTION OF BACKGROUND ART

A by-wire type braking device for a motorcycle is known wherein the amount of operation of a brake operating portion such as a brake lever is detected electrically and wheel braking means is operated on the basis of the detected value with use of hydraulic pressure created by a hydraulic modulator. See, for example, JP-A No. 310717/2001.

A by-wire type braking device is known wherein a master cylinder is interlocked with a brake lever (brake operating portion) and a brake caliper (wheel braking means) for imparting a braking force to a wheel by a hydraulic operation that are connected together through a main brake passage provided with a first electromagnetic opening/closing valve of a normally open type. A hydraulic modulator is provided for supplying a hydraulic pressure generated by an electric actuator to the brake caliper that is connected to the main brake passage on the brake caliper side with respect to the first electromagnetic opening/closing valve. A hydraulic loss simulator is provided for exerting a simulative hydraulic reaction force on the master cylinder in accordance with the amount of operation of the brake operating portion and is connected to the main brake passage on the master cylinder side with respect to the first electromagnetic opening/closing valve. A second electromagnetic opening/closing valve of a normally closed type is disposed between the main brake passage and the hydraulic loss simulator.

In this known braking device, when the brake is not actuated, the first electromagnetic opening/closing valve is open and the second electromagnetic opening/closing valve is closed, then when there is a braking input, an electric current is supplied to the first electromagnetic opening/closing valve to close the same valve, thereby closing the main brake passage. Thus, the brake caliper and the hydraulic modulator are disconnected from the master cylinder, and a hydraulic pressure proportional to the amount of operation of the brake lever is generated by the hydraulic modulator and is supplied to the brake caliper to actuate the brake. At the same time, an electric current is supplied to the second electromagnetic opening/closing valve to open the same valve, whereby the hydraulic loss simulator and the master cylinder communicate with each other and a simulative reaction force developed by the hydraulic loss simulator acts on the brake operating portion through the master cylinder.

However, in the braking device of this type, it is possible that there will occur a time lag from the time the amount of operation of the brake operating portion is detected until the hydraulic pressure of the wheel braking means is changed. Consequently, in the case where the time lag increases, the actual amount of operation of the brake operating portion further increases when the hydraulic modulator is controlled on the basis of the amount of operation of the brake operating portion, with a consequently increase in the difference between a target control pressure in the hydraulic modulator and the actual braking pressure in the wheel braking means. Therefore, with respect to the point of feeling of the rider, it is not preferable that the hydraulic modulator be controlled for a sudden increase of its pressure so as to compensate for the aforesaid difference when the control of the hydraulic modulator has proceeded from this state.

SUMMARY AND OBJECTS OF THE INVENTION

Accordingly, it is an object of the present invention to provide a braking device for a motorcycle to be able to control a sudden increase of the braking force caused by a time lag from the time the amount of the operation of the brake operating portion is detected until the hydraulic pressure of the wheel braking means is changed to thereby be able to improve the feeling of braking.

For achieving the above-mentioned object, according to an embodiment of the invention there is provided a braking device for a motorcycle, comprising input state detecting means for detecting the behavior of a brake operating portion, a hydraulic modulator for creating a hydraulic pressure to be exerted on wheel braking means, and hydraulic pressure control means for controlling the hydraulic pressure created by the hydraulic modulator in accordance with a detected signal provided from the input state detecting means. The hydraulic pressure control means includes change speed limiting means for limiting a speed change of the hydraulic pressure created by the hydraulic modulator in accordance with a change in the quantity per unit time of a detected value provided from the input state detecting means.

According to this construction, when the operational speed of the brake operating portion increases with a consequential increase in the difference between a target control pressure proportional to the detected value provided from the input state detecting means and the actual braking pressure of the wheel braking means, a speed change of the hydraulic pressure created by the hydraulic modulator is limited by the hydraulic pressure control means to prevent a sudden increase in the braking force of the wheel braking means.

According to an embodiment of the invention there is provided a braking device for a motorcycle that further includes an output-side pressure sensor for detecting the hydraulic pressure of the wheel braking means.

In this case, by detecting the actual hydraulic pressure of the wheel braking means through the output-side pressure sensor when the operating speed of the brake operating portion increases, it becomes possible to effect a satisfactory control according to the difference between the target control pressure proportional to the detected value provided from the input state detecting means and the actual braking pressure of the wheel braking means.

According to an embodiment of the invention, a braking device for a motorcycle includes a signal provided from the input state detecting means for detecting the behavior of the brake operating portion and a signal provided from the output-side pressure sensor for detecting the hydraulic pressure of the wheel braking means that are processed by a single controller.

In this case, the controller can calculate the target control pressure while detecting the signal from the input state detecting means and the signal from the wheel braking means.

According to an embodiment of the invention, when the difference between the target control pressure responsive to a braking operation and the braking pressure of the wheel braking means increases as a result of an increase in the operational speed of the brake operating portion, the change speed of the hydraulic pressure created by the hydraulic modulator is limited, so that the deterioration of the brake feeling can be prevented by preventing a sudden increase in the braking force in the wheel braking means.

According to an embodiment of the invention, since the actual hydraulic pressure of the wheel braking means can be fed back accurately by the output-side pressure sensor, the change speed of the hydraulic pressure developed by the hydraulic modulator can be limited with a high accuracy. Therefore, both an improvement in the brake feeling and a shortening of the braking distance can be attained at a high level.

According to an embodiment of the invention, since the target control pressure can be calculated while detecting the signal from the input state detecting means and the signal from the wheel braking means with use of a single controller, the limitation of the change speed of the hydraulic pressure developed by the hydraulic modulator can be effected at a reasonable cost (while avoiding an unnecessary increase of cost).

In the above braking device, however, there is a slight time lag until the first and second electromagnetic opening/closing valves perform their opening and closing motions after a braking input. Therefore, not only the stroke of the brake lever is influenced but also the generation of a hydraulic pressure by the hydraulic modulator is delayed.

A countermeasure may be such that, when an ignition switch is turned ON or when the vehicle speed reaches a predetermined vehicle speed, an electric current is supplied to the first and second electromagnetic opening/closing valve to close the first electromagnetic opening/closing valve, thereby closing the main brake passage, and open the second electromagnetic opening/closing valve, thereby providing communication between the hydraulic loss simulator and the master cylinder, thus creating a stand-by state from the time when the brake is not actuated. However, this method causes an increase in power consumption because both first and second electromagnetic opening/closing valves are kept ON.

Moreover, if the first electromagnetic opening/closing valve is kept ON, the hydraulic pressure in the hydraulic modulator and the brake caliper is not released to the atmosphere, so that a drag condition of a brake pad is likely to occur.

In view of the above-mentioned circumstances, the present invention provides a braking device in a motorcycle that is able to eliminate the time lag, decrease the power consumption and prevent drag of the brake pad.

For solving the above-mentioned problem, according to an embodiment of the invention there is provided a braking device for a motorcycle, comprising a master cylinder (e.g., a master cylinder 3 in an embodiment to be described later) interlocked with a brake operating portion (e.g., a brake operating portion 2 in the embodiment), wheel braking means (e.g., a brake caliper 4 in the embodiment) which imparts a braking force to a wheel with use of a hydraulic pressure in the master cylinder, a main brake passage (e.g., a main brake passage 5 in the embodiment) which connects the master cylinder with the wheel braking means, a hydraulic modulator (e.g., a hydraulic modulator 6 in the embodiment) which supplies a hydraulic pressure generated by an electric actuator (e.g., an electric motor 23 in the embodiment) to the wheel braking means through the main brake passage, and a first electromagnetic opening/closing valve of a normally open type (e.g., a first electromagnetic opening/closing valve V1 in the embodiment) disposed on the master cylinder side with respect to a connection of the main brake passage with the hydraulic modulator. When applying the brake, the electric actuator is controlled in accordance with the amount of operation of the brake operating portion in a closed state of the first electromagnetic opening/closing valve to supply a hydraulic pressure to the wheel braking means through the hydraulic modulator. The first electromagnetic opening/closing valve is opened when a main power supply is turned ON or until the vehicle speed reaches a predetermined vehicle speed, and after arrival of the vehicle speed at the predetermined vehicle speed, a rated electric current is supplied to the first electromagnetic opening/closing valve to close the valve. Thereafter, the electric current supplied to the first electromagnetic opening/closing valve is decreased within a range able to maintain this state of operation.

According to this construction, the master cylinder can be kept disconnected from the hydraulic modulator and the wheel braking means when the brake is not actuated, so that the stroke of operation of the brake operating portion becomes stable when applying the brake. Moreover, when there is a braking input, the hydraulic pressure can be generated immediately by the hydraulic modulator. Further, after closing the first electromagnetic opening/closing valve by passing the rated electric current thereto, the valve can be kept closed by decreasing the electric current flowing in the valve.

According to an embodiment of the invention, a braking device for a motorcycle is provided wherein, when a braking input after the electric current supplied to the first electromagnetic opening/closing valve has been decreased, the rated electric current is supplied to the first electromagnetic opening/closing valve.

According to this construction, the closed state of the first electromagnetic opening/closing valve can be maintained positively when applying the brake, so that the master cylinder can be kept disconnected positively from the hydraulic modulator and the wheel braking means when applying the brake.

According to an embodiment of the invention, a braking device for a motorcycle, further includes a hydraulic loss simulator which, in accordance with the amount of operation of the brake operating portion, exerts a simulative hydraulic reaction force on the master cylinder through the main brake passage located on the master cylinder side with respect to the first electromagnetic opening/closing valve, and a second electromagnetic opening/closing valve of a normally closed type disposed between the main brake passage and the hydraulic loss simulator. The second electromagnetic opening/closing valve are opened when applying the brake. When the main power supply is turned ON or until the vehicle speed reaches the predetermined vehicle speed, the first electromagnetic opening/closing valve is opened and the second electromagnetic opening/closing valve is closed, and after arrival of the vehicle speed at the predetermined vehicle speed, the rated electric current is supplied to the first electromagnetic opening/closing valve to close the valve and the rated electric current is supplied to the second electromagnetic opening/closing valve to open the valve. Thereafter, the electric current supplied to the first and second electromagnetic opening/closing valve is decreased within a range able to maintain this state of operation.

According to this construction, when the brake is not actuated, the master cylinder can be disconnected from the hydraulic modulator and the wheel braking means and the master cylinder and the hydraulic loss simulator can be maintained in communication with each other. Consequently, the stroke of operation of the brake operating portion becomes stable when applying the brake. In addition, when there is a braking input, the hydraulic pressure can be developed immediately by the hydraulic modulator. Further, after the opening and closing operations of the first and second electromagnetic opening/closing valves by passing the rated electric current thereto, the respective operational conditions can be maintained by decreasing the electric current flowing in both valves.

According to an embodiment of the invention, a braking device for a motorcycle is provided wherein when a braking input after the electric current supplied to the first and second electromagnetic opening/closing valves has been decreased, the rated electric current is supplied to the first and second electromagnetic opening/closing valves.

According to this construction, the closed state of the first electromagnetic opening/closing valve and the open state of the second electromagnetic opening/closing valve can be maintained positively when applying the brake, so that, when applying the brake, the master cylinder can be disconnected positively from the hydraulic modulator and the wheel braking means and the master cylinder and the hydraulic loss simulator can be maintained in communication with each other.

According to an embodiment of the invention there is provided a braking device for a motorcycle, that includes a master cylinder interlocked with a brake operating portion, wheel braking means for imparting a braking force to a wheel with use of a hydraulic pressure in the master cylinder, a main brake passage for connecting the master cylinder with the wheel braking means, a hydraulic modulator for supplying a hydraulic pressure generated by an electric actuator to the wheel braking means through the main brake passage, and a first electromagnetic opening/closing valve of a normally open type disposed on the master cylinder side with respect to a connection between the main brake passage and the hydraulic modulator. When applying the brake, the electric actuator is controlled in accordance with the amount of operation of the brake operating portion in a closed state of the first electromagnetic opening/closing valve to supply hydraulic pressure to the wheel braking means through the hydraulic modulator, wherein the first electromagnetic opening/closing valve is opened when a main power supply is turned ON or until the vehicle speed reaches a predetermined vehicle speed, the first electromagnetic opening/closing valve is closed after arrival of the vehicle speed at the predetermined vehicle speed, and when there is a brake release input after the application of the brake in response to a braking input in this state, the first electromagnetic opening/closing valve is opened temporarily at a predetermined timing when the brake is not actuated.

According to this construction, when there is a brake release input after the application of the brake in response to a brake input, the hydraulic pressure remaining in both the hydraulic modulator and wheel braking means can be allowed to escape to the master cylinder side by opening the first electromagnetic opening/closing valve temporarily.

According to an embodiment of the invention, a braking device for a motorcycle, further includes a hydraulic loss simulator which, in accordance with the amount of operation of the brake operating portion, exerts a simulative hydraulic reaction force on the master cylinder through the main brake passage located on the master cylinder side with respect to the first electromagnetic opening/closing valve, and a second electromagnetic opening/closing valve of a normally closed type disposed between the main brake passage and the hydraulic loss simulator. The second electromagnetic opening/closing valve is opened when applying the brake wherein the main power supply is turned ON or until the vehicle speed reaches the predetermined vehicle speed, the first electromagnetic opening/closing valve is opened and the second electromagnetic opening/closing valve is closed, then after arrival of the vehicle speed at the predetermined vehicle speed, the first electromagnetic opening/closing valve is closed and the second electromagnetic opening/closing valve is opened, and when there is a brake release input after the application of the brake in response to a braking input in this state, the first electromagnetic opening/closing valve is opened and the second electromagnetic opening/closing valve is closed temporarily at a predetermined timing when the brake is not actuated.

According to this construction, when there is a brake release input after the application of the brake in response to a braking input, the hydraulic pressure remaining in both hydraulic modulator and wheel braking means can be allowed to escape to the master cylinder side by opening the first electromagnetic opening/closing valve temporarily.

According to an embodiment of the invention, a braking device for a motorcycle, further includes a third electromagnetic opening/closing valve of a normally closed type disposed between the main brake passage and the hydraulic modulator that is adapted to open only when there is a braking input.

According to this construction, when there is a braking input, the hydraulic pressure can be supplied positively from the hydraulic modulator to the wheel braking means, while when there is no braking input, it is possible to prevent the hydraulic pressure from being supplied to the wheel braking means from the hydraulic modulator.

According to an embodiment of the invention, since the master cylinder can be kept disconnected from the hydraulic modulator and the wheel braking means when the brake is not actuated, the stroke of operation of the brake operating portion becomes stable and the feeling of braking is improved when applying the brake. In addition, since the hydraulic pressure can be generated by the hydraulic modulator as soon as there is a braking input, it is possible to attain a stable braking performance. Further, after the first electromagnetic opening/closing valve has been closed by supplying the rated electric current thereto, the same valve can be maintained in a closed state by decreasing the electric current flowing therein, so that it is possible to diminish the power consumption.

According to an embodiment of the invention, since the closed state of the first electromagnetic opening/closing valve can be maintained positively when the brake is actuated, the master cylinder can be kept disconnected positively from the hydraulic modulator and the wheel braking means when the brake is actuated.

According to an embodiment of the invention, since the master cylinder can be disconnected from the hydraulic modulator and the wheel braking means and the master cylinder and the hydraulic loss simulator can be maintained in communication with each other when the brake is not actuated, the stroke of operation of the brake operating portion becomes stable and the feeling of braking is improved when applying the brake. Moreover, since the hydraulic pressure can be generated by the hydraulic modulator as soon as there is a braking input, it is possible to attain a stable braking performance. Further, after the opening and closing operations of the first and second electromagnetic opening/closing valves by supplying the rated electric current thereto, this state can be maintained by decreasing the electric current flowing in these valves. Consequently, it is possible to diminish the power consumption.

According to an embodiment of the invention, since the first and second electromagnetic opening/closing valves can be positively kept closed and open, respectively, when the brake is actuated, not only the master cylinder can be disconnected positively from the hydraulic modulator and the wheel braking means but also the master cylinder and the hydraulic loss simulator can be maintained in communication with each other when the brake is actuated.

According to an embodiment of the invention, when there is a brake release input after the application of the brake in response to a braking input, the hydraulic pressure remaining in both the hydraulic modulator and wheel braking means can be allowed to escape to the master cylinder side by opening the first electromagnetic opening/closing valve temporarily. Therefore, the hydraulic pressure in both hydraulic modulator and wheel braking means can be released to the atmospheric pressure. Thus, it is possible to prevent drag of the brake pad.

According to an embodiment of the invention, when there is a braking input, the hydraulic pressure can be supplied positively from the hydraulic modulator to the wheel braking means, while when there is no braking input, it is possible to prevent the hydraulic pressure from being supplied to the wheel braking means from the hydraulic modulator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Next, an embodiment of the present invention will be described hereinunder with reference to the drawings.

Figure 1:
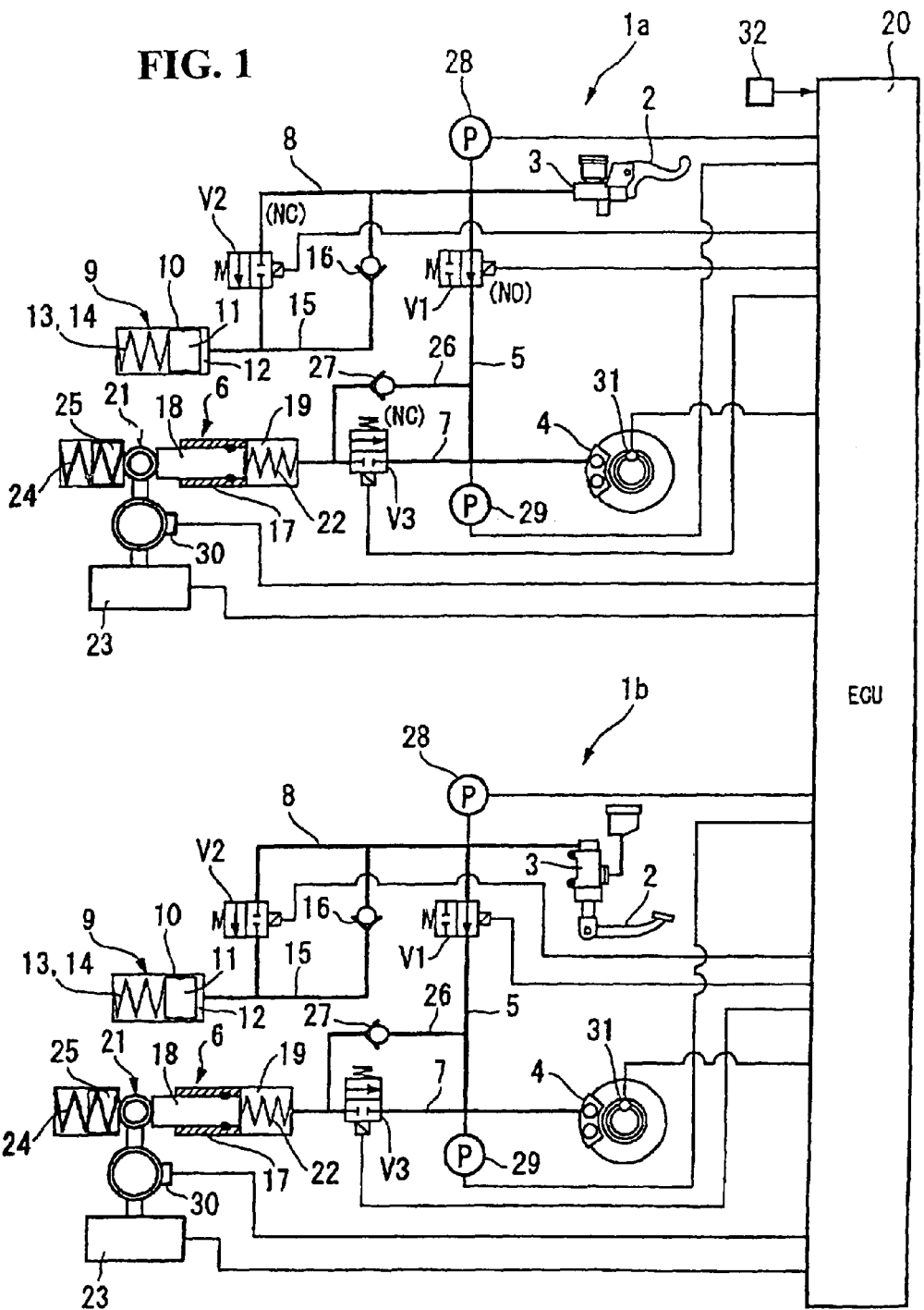
FIG. 1 is a hydraulic circuit diagram of a braking device according to an embodiment of the present invention.

FIG. 1 is a hydraulic circuit diagram of a braking device for a motorcycle according to an embodiment of the present invention. In the braking device of this embodiment, a front wheel-side brake circuit 1a and a rear wheel-side brake circuit 1b, which are independent of each other, are connected together through a controller (ECU) 20.

In the front wheel-side brake circuit 1a, a braking operation is performed by a brake lever as a brake operating portion 2, while in the rear wheel-side brake circuit 1b, a braking operation is performed by a brake pedal as a brake operating portion 2. Other constructional points are substantially common to both the front wheel-side brake circuit 1a and rear wheel-side brake circuit 1b. Therefore, only the front wheel-side brake circuit 1a will be described in detail, while as to the rear wheel-side brake circuit 1b, the same portions as in the front wheel-side brake circuit 1a will be identified by the same reference numerals as in the front wheel-side brake circuit to omit tautological explanations.

The braking device adopts the by-wire method in both front and rear wheels, in which the amount of operation (a hydraulic pressure in this embodiment) of the brake operating portion such as a brake lever is detected electrically and a braking force is generated by a hydraulic pressure which is created by a hydraulic modulator on the basis of the detected value.

This braking device adopts a brake system (CBS: COMBINED BRAKE SYSTEM, hereinafter referred to as "CBS") wherein front and rear wheel braking means perform a braking operation interlockedly by applying the brake to one of front and rear wheels.

More specifically, in the brake circuit wherein a brake operating portion 2 has been operated earlier than the brake operating portion 2 in the other brake circuit, a hydraulic pressure developed by the hydraulic modulator on the basis of the hydraulic pressure in a master cylinder is exerted oil the brake caliper in accordance with the by-wire method. Also in the later-operated brake circuit, on the basis of the master cylinder pressure in the earlier-operated brake circuit, the hydraulic pressure created by the hydraulic modulator acts on the brake caliper in accordance with the by-wire method.

Further, this braking device adopts a brake system (ABS: ANTI LOCK BRAKE SYSTEM, hereinafter referred to as "ABS") wherein a wheel slip ratio based on a braking operation when applying the brake is controlled.

In each of the brake circuits 1a and 1b, a master cylinder 3 interlocked with the brake operating portion 2 and a brake caliper 4 associated with the master cylinder 3 are connected with each other through a main brake passage 5. A hydraulic modulator 6 to be described later is joined to an intermediate position of the main brake passage 5 through a feed/discharge passage 7.

A first electromagnetic opening/closing valve V1 of a normally open type (NO) for making and breaking communication between the master cylinder 3 and the brake caliper 4 is interposed in and a branch passage 8 is connected to the main brake passage 5 on the master cylinder 3 side with respect to the confluent portion where the feed/discharge passage 7 joins to the main brake passage 5. A hydraulic loss simulator 9 is connected to the branch passage 8 through a second electromagnetic opening/closing valve V2 of a normally closed type (NC). The hydraulic loss simulator exerts a simulative hydraulic reaction force proportional to the amount of operation of the brake operating portion 2 on the master cylinder 3 when the first electromagnetic opening/closing valve V1 closes the main brake passage 5. When imparting a reaction force to the master cylinder 3, the second electromagnetic opening/closing valve V2 opens the branch passage 8 to provide communication between the master cylinder 3 and the hydraulic loss simulator 9.

In the hydraulic loss simulator 9, a piston 11 is received within a cylinder 10 so as to be movable forward and backward and a fluid chamber 12 for receiving therein working fluid flowing from the master cylinder 3 side is formed between the cylinder 10 and the piston 11. A coiled spring 13 and a resin spring 14, which are different in characteristics, are arranged in series behind the piston 11. With both coiled spring 13 and resin spring 14, a reaction force of such a characteristic as a gentle rise and a rapid rise at a stroke end is imparted to the piston 11 (the brake operating portion 2).

A bypass 15 is formed in the branch passage 8 so as to bypass the second electromagnetic opening/closing valve V2. In the bypass 15 is mounted a check valve 16 which permits the flow of working fluid from the hydraulic loss simulator 9 side toward the master cylinder 3.

The hydraulic modulator 6 includes a cam mechanism 21 which urges a piston 18 disposed within a cylinder 17 toward a hydraulic pressure chamber 19 formed between the cylinder 17 and the piston 18, a return spring 22 which urges the piston 18 constantly against the cam mechanism 21, and an electric motor 23 for actuating the cam mechanism 21. The hydraulic pressure chamber 19 is connected in communication with the feed/discharge passage 7. In the hydraulic modulator 6, the piston 18 is urged on the basis of an initial position in the cylinder 17 through the cam mechanism 21 by means of the electric motor 23 or is returned by the return spring 22 to increase or decrease the internal pressure of the hydraulic pressure chamber 19, whereby the braking pressure for the brake caliper 4 can be increased or decreased.

In this case, by PWM control, the electric motor 23 adjusts the value of an electric current determined by an input duty ratio (ON time/ON time+OFF time), thereby adjusting the position of the piston 18 electrically in an accurate and simple manner which piston position is determined as a rotational position of the cam mechanism 21. Thus, the pressure of the hydraulic pressure chamber 19 is adjusted.

In the cam mechanism 21 is disposed a lifter 25 so as to be movable forward and backward through a backup spring 24, the stroke of the lifter 25 being restricted by a stopper (not shown). With the lifter 25, the piston 18 is urged constantly in a direction to diminish the hydraulic pressure chamber 19. According to this constriction, when the electric motor 23 turns OFF, the lifter 25 is urged by the backup spring 24 and is stopped by the stopper, causing the piston 18 to move back to its initial position. Thus, it is possible to perform CBS control for supplying the working fluid positively to the main brake passage 5 (brake caliper 4) and ABS control for moving the piston 18 forward and backward to reduce, hold and re-increase the internal pressure of the hydraulic pressure chamber 19. Thus, the pressure of the hydraulic pressure chamber 19 is adjusted.

A third electromagnetic opening/closing valve V3 of a normally closed type (NC) is interposed in the feed/discharge passage 7. A bypass 26 is formed in the feed/discharge passage 7 so as to bypass the electromagnetic opening/closing valve V3. In the bypass 26 is disposed a check valve 27 which permits the flow of working fluid from the hydraulic modulator 6 side toward the brake caliper 4.

In the brake circuit 1a on the front wheel side and the brake circuit 1b on the rear wheel side, a pressure sensor (P) 28 is disposed on an input side which is the master cylinder 3 side and a pressure sensor (P) 29 is disposed on an output side which is the brake caliper 4 side, with the first electromagnetic opening/closing valve V1 there between. An angle sensor 30 for the feedback of angle information is mounted on a cam shaft (not shown) of the cam mechanism 21, while a wheel speed sensor 31 for detecting the wheel speed is disposed in the brake caliper 4. Further, a mode selector switch 32 for switching between control modes by manual operation of the rider is provided, and when CBS control is desired, the rider selects it manually. The following description relates to the case where CBS control is selected.

More specifically, when one brake operating portion 2 is operated, front and rear wheel speeds are inputted from the wheel speed sensors 31 to the controller 20 and information such as the amount of braking operation is inputted to the controller 20 through the pressure sensors 28. At this time, in accordance with a command provided from the controller 20, the first electromagnetic opening/closing valves V1 in both brake circuits are maintained in a direction to close the main brake passage 5, while the electromagnetic opening/closing valves V2, V3 are maintained in an opening direction, and both hydraulic modulators 6 supply the brake calipers 4 with a hydraulic pressure corresponding to vehicular operating conditions or braking operation.

The controller 20 sets the higher wheel speed as an estimated vehicle speed vr out of wheel speeds detected by both front and rear wheel-side wheel speed sensors 31 and calculates a front or rear wheel slip ratio on the basis of the difference between the estimated vehicle speed vr and the front or rear wheel speed. When the front or rear wheel slip ratio exceeds a preset threshold value of slip ratio, it is determined that a wheel slip has occurred, and ABS control for reducing the hydraulic pressure of the hydraulic modulator 6 is started.

According to the above construction, when the vehicle is at standstill or is in a state close to a standstill state (vehicle speed=0 or below a predetermined vehicle speed), the first electromagnetic opening/closing valve V1 is open and the second and third electromagnetic opening/closing valves are closed in each of the front and rear wheel brake circuits 1a, 1b, as shown in FIG. 1. Therefore, the valves V1, V2 and V3 require no electric power.

Figure 2:
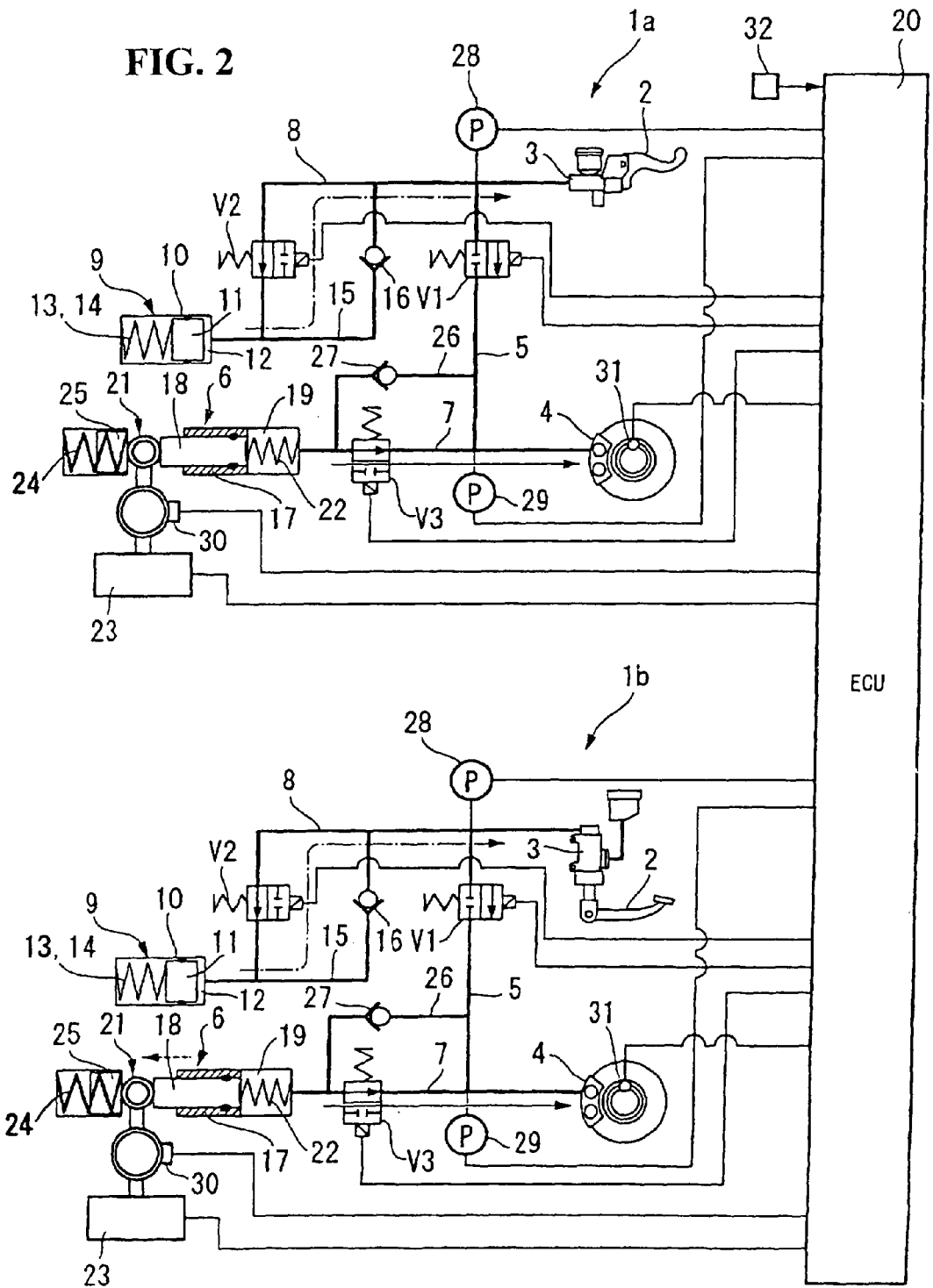
FIG. 2 is a hydraulic circuit diagram of the braking device.

When the rider operates the brake lever as the front wheel-side brake operating portion 2 while the vehicle is running, the first electromagnetic opening/closing valve V1 is closed and the second and third electromagnetic opening/closing valves V2, V3 are opened in the front wheel brake circuit 1a, as shown in FIG. 2. Consequently, the main brake passage 5 is disconnected from the master cylinder 3 by closing of the first electromagnetic opening/closing valve V1. At the same time, by opening of the second electromagnetic opening/closing valve V2, the branch passage 8 and the main brake passage 5 provide communication between the master cylinder 3 and the hydraulic loss simulator 9. Further, by opening of the third electromagnetic opening/closing valve V3, the feed/discharge passage 7 and the main brake passage 5 provide communication between the hydraulic modulator 6 and the brake caliper 4.

At this time, also in the rear wheel brake circuit 16b, the first electromagnetic opening/closing valve V1 is closed and the second and third electromagnetic opening/closing valves V2, V3 are opened. Consequently, the main brake passage 5 is disconnected from the master cylinder 3 by closing of the first electromagnetic opening/closing valve V1 and at the same time the branch passage 8 and the main brake passage 5 provide communication between the master cylinder 3 and the hydraulic loss simulator 9 by the opening of the second electromagnetic opening/closing valve V2. Further, the feed/discharge passage 7 and the main brake passage 5 provide communication between the hydraulic modulator 6 and the brake caliper 4 by the opening of the third electromagnetic opening/closing valve V3.

In accordance with detected signals provided from the pressure sensors 28, 29, the angle sensor 30 and the wheel speed sensor 31 the controller 20 controls the opening and closing of the first, second and third electromagnetic opening/closing valves V1, V2, V3 and controls the operation of the electric motor 23.

More specifically, when the vehicular power supply is ON and the vehicle is at standstill (vehicle speed=0), as shown in FIG. 1, the first electromagnetic opening/closing valve V1 is open, the second electromagnetic opening/closing valve V2 is closed, and the third electromagnetic opening/closing valve V3 is closed, in the front wheel-side brake circuit 1a and the rear wheel-side brake circuit 1b. Therefore, no electric power is required in the valves V1, V2 and V3.

Figure 7:
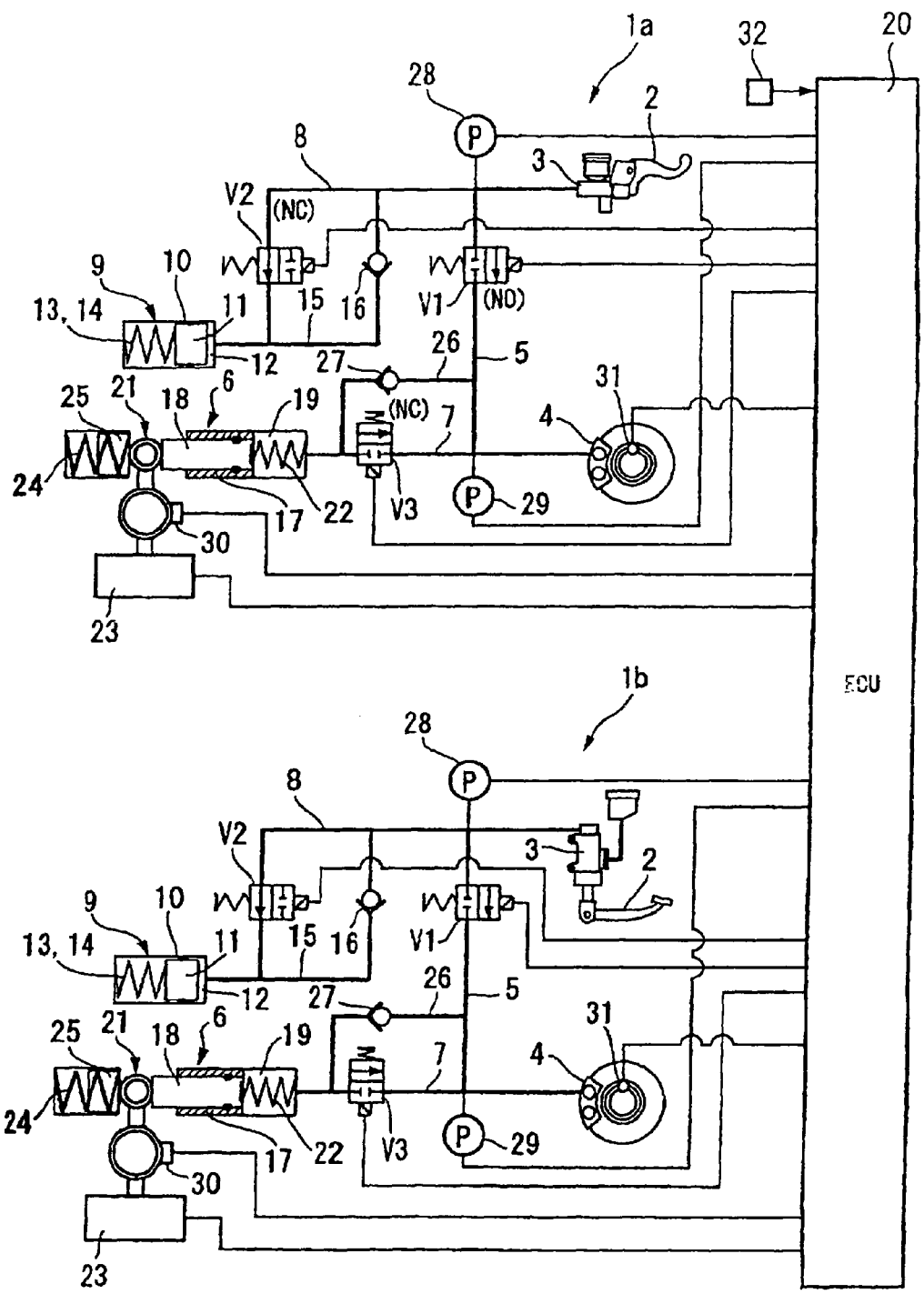
FIG. 7 is a hydraulic circuit diagram in a stand-by state of the braking operation of the braking device.

When the vehicle begins to run in this state, the speed of the front and rear wheels are inputted to the controller 20 from the wheel speed sensor 31 and the higher wheel speed out of the front and rear wheel speeds is assumed to be an estimated vehicle speed vr. When it is detected that the estimated vehicle speed vr has reached a predetermined vehicle speed (e.g., several km/hr), as shown in FIG. 7, a stand-by state is created wherein the first electromagnetic opening/closing valve V1 is closed and the second electromagnetic opening/closing valve V2 is open in the front wheel-side brake circuit 1a and the rear wheel-side brake circuit 1b. As a result, the main brake passage 5 is cut off by the closing operation of the first electromagnetic opening/closing valve V1 and at the same time the branch passage 8 and the main brake passage 5 provide communication between the master cylinder 3 and the hydraulic loss simulator 9 by the opening operation of the second electromagnetic opening/closing valve V2. At this time, the third electromagnetic opening/closing valve V3 is held in a non-conducting state and is therefore closed.

The first, second and third electromagnetic opening/closing valves switch from one to the other state by energizing their solenoids. The switching operation requires the rated electric current, but for maintaining this switched state, an operating state holding current suffices which is smaller than the rated electric current.

Thus, all that is required is merely keeping the first electromagnetic opening/closing valve V1 closed and the second electromagnetic opening/closing valve V2 open by the operating state holding current, so that the power consumption can be kept low. This stand-by state is maintained until input of a braking signal to the control 20 (that is, until there is a braking input).

When the rider operates the brake lever such as the brake operating portion 2 on the front wheel side during vehicular running (that is, when there is a braking input to the controller 20), information such as the amount of brake operation is inputted to the controller 20 through the pressure sensor 28. As shown in FIG. 2, the controller 20 makes control to let the rated electric current flow again through the first and second electromagnetic opening/closing valves. V1, V2 in the front wheel-side brake circuit 1a to positively keep the valves V1 and V2 closed and open, respectively. At the same time, the controller 20 causes the rated electric current to flow through the third electromagnetic opening/closing valve V3 to open the same valve, thereby providing communication between the hydraulic modulator 6 and the brake caliper 4 through the feed/discharge passage 7 and the main brake passage 5.

As illustrated in FIG. 2, at this time, also in the rear wheel-side brake circuit 1b, the rated electric current is again allowed to flow in the first and second electromagnetic opening/closing valves V1, V2 to positively keep the valves V1 and V2 closed and open, respectively. At the same time, the rated electric current is allowed to flow in the third electromagnetic opening/closing valve V3 to open the valve, thereby providing communication between the hydraulic modulator 6 and the brake caliper 4 through the feed/discharge passage 7 and the main brake passage 5.

As a result, it becomes possible for the rider to have a brake operation feeling on the front and rear wheel side reproduced simulatively by the hydraulic loss simulators 9 in the front and rear wheel brake circuits 1a and 1b (see the chain-line arrow in FIG. 2). At the same time, a variation in hydraulic pressure caused by operation of the hydraulic modulator 6 is no longer transferred to the rider because the first electromagnetic opening/closing valve V1 is closed. Concurrently, the electric motors 23 in both hydraulic modulators 6 are each controlled in accordance with vehicular operation conditions or braking conditions and the piston 18 is pushed by the cam mechanism 21, thereby pressurizing the working fluid in the hydraulic pressure chamber 19. In this way, hydraulic pressure corresponding to the control of the electric motor 23 is supplied to the brake caliper 4 through the main brake passage 5 (see the solid-line arrow in FIG. 2).

When it is detected by the wheel speed sensor 31 that the slip ratio of the front or rear wheel (e.g., the front wheel in FIG. 2) against the road surface is about to exceed a predetermined value, the controller 20 controls the electric motor 23 to retreat the piston 18 (indicated by a broken-line arrow in FIG. 2), thereby reducing the braking pressure of the brake caliper 4 and allowing the wheel slip ratio to return to a value of not larger than the predetermined value under ABS control.

The controller 20 sets the higher wheel speed as an estimated vehicle speed vr out of wheel speeds detected by the front and rear wheel-side wheel speed sensors 31 and, on the basis of the difference between the estimated wheel speed vr and the front or rear wheel speed, calculates a front or rear wheel slip ratio. When the front or rear wheel slip ratio exceeds a preset threshold value of slip ratio (e.g., the front wheel in FIG. 3), it is determined that a wheel slip has occurred, and ABS control for reducing the hydraulic pressure of the hydraulic modulator 6 is started. In this control, the controller 20 controls the electric motor 23 to retreat the piston 18 (indicated by a broken-line arrow in FIG. 2), thereby reducing the braking pressure of the brake caliper 4 to avoid the locking of the wheel.

At this time, the first electromagnetic opening/closing valve V1 is closed to cut off communication between the master cylinder 3 and the hydraulic modulator 6, so that a pressure change in the ABS control is not transferred to the brake operating portion 2 for the rider.

The above description is of the case where the vehicle is stopped without the operation of the ABS despite the operation of the brake operating portion 2, but it is possible to effect control also in the case where the ABS has been operated and the vehicle stopped. More specifically, in the case where the ABS has been operated, it is impossible to specify which is the larger between the pressure on the master cylinder 3 side and the pressure on the brake caliper 4 side, depending on at which point in time the vehicle is stopped, because in the ABS the internal pressure of the hydraulic pressure chamber 19 is reduced, maintained and re-increased. Therefore, also in the case of including both forward rotation and reverse rotation of the electric motor 23 and performing PWM control to adjust the value of an electric current determined by the input duty ratio, thereby increasing or decreasing the pressure, the position of the piston 18, which is determined by the rotational position of the cam mechanism 21, can be freely adjusted electrically in an accurate and simple manner.

In this braking device, a pressure signal on the master cylinder 3 side is inputted as a signal indicating the rider's input to the controller 20 from the input-side pressure sensor 28 (input state detecting means) and a pressure signal on the brake caliper 4 side is inputted as a feedback signal to the controller 20 from the output-side pressure sensor 29. Upon receipt of these signals, the controller 20 determines a target hydraulic pressure value for the brake caliper 4 and feedback-controls the hydraulic modulator 6 (electric motor 23) so as to afford a target value. In this embodiment, detection of the signals provided from both pressure sensors 28 and 29 and calculation of the target value are performed by a single controller 20. A plurality of such controllers may be provided, but according to the construction of this embodiment all the processing is carried out by a single controller 20. Thus, it is possible to attain a reasonable reduction of cost.

The target hydraulic pressure value set by the controller 20 is basically determined by a calculation in such a manner that the difference between the input pressure on the master cylinder 3 side and the output pressure on the brake caliper 4 side becomes zero in an early stage. But in this braking device, when a change quantity (change speed) per unit time of the target hydraulic pressure value in the said basic calculation is above a predetermined value, the change of the target hydraulic pressure value is limited, a change speed limiting means is provided, lest the change quantity of the target hydraulic pressure value should undergo any greater change.

Thus, the change speed of the target hydraulic pressure value is kept below the predetermined value, with a result that an abrupt change in the hydraulic pressure developed by the hydraulic modulator 6 is limited.

Figure 4:
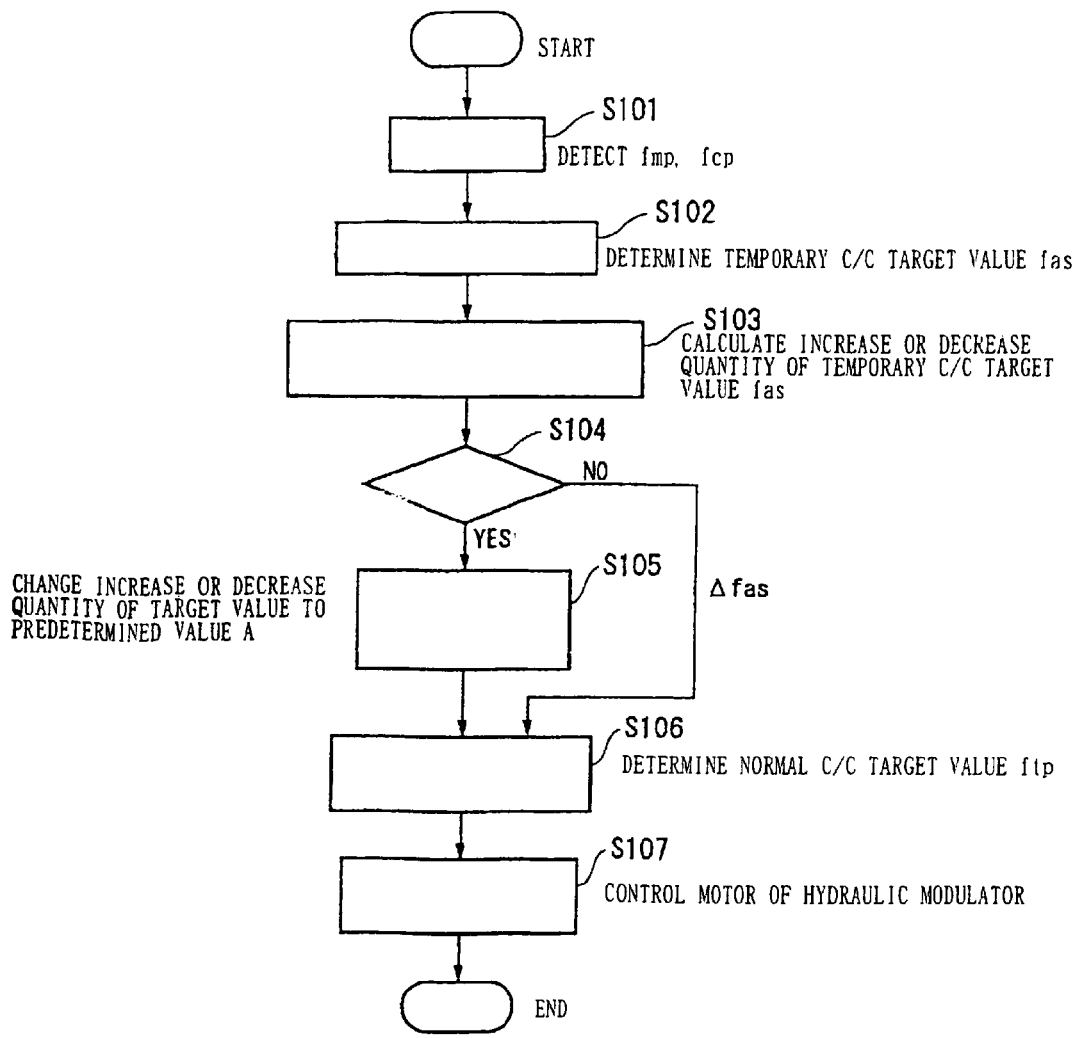
FIG. 4 is a flowchart showing a hydraulic modulator control when applying the brake in the embodiment.

A concrete hydraulic pressure control performed by the controller 20 will be described below in accordance with the flowchart of FIG. 4. Although the following description will be given with respect to the front wheel-side hydraulic pressure control, this is basically true of the rear wheel side.

First, in S101, a hydraulic pressure fmp on the master cylinder side 3 is detected by the input-side pressure sensor 28 and a hydraulic pressure fcp on the brake caliper 4 side is detected by the output-side pressure sensor 29. Then, in S102, a temporary target hydraulic pressure value fas of the brake caliper 4 is determined from the master cylinder pressure fmp and further from the difference between the master cylinder pressure fmp and the brake caliper pressure fcp (the foregoing basic calculation).

Next, in S103, a temporary target hydraulic pressure value fas_p in the last-time processing is subtracted from the present temporary target hydraulic pressure value fas to determine an increase or decrease quantity Δfas (a change speed of the target hydraulic pressure value) per unit time (for one control loop). Then, in S104 which follows, it is determined whether the increase or decrease quantity Δfas is not smaller than a predetermined value A. predetermined value A, the processing flow advances to S105, in which the value If the increase or decrease quantity Δfas is smaller than the predetermined value A, the processing flow advances to S106, while if it is not smaller than the of the increase or decrease quantity Δfas of the target hydraulic pressure value per unit time is fixed (limited) to the predetermined value A.

In S106, a normal target hydraulic pressure value ftp of the brake caliperpressure is determined by the following equation:

$$ftp = ftp\_p + \Delta fas$$

where ftp_p stands for a normal target hydraulic pressure value in the last-time processing.

The calculation of S106 is the addition of the increase or decrease quantity Δfas to the normal target hydraulic pressure value ftp_p in the last-time processing. However, in the case of a processing not going through Sl05, the net increase or decrease quantity Δfas is added as it is to the target hydraulic pressure value ftp_p in the last-time processing. In the case of the processing having gone through S104, only the predetermined value A is added to the target hydraulic pressure value ftp_p in the last-time processing. That is, in the case of the processing having gone through S104, the change speed of the target hydraulic pressure value ftp is limited.

Next, in S107, with the value determined in S106 as the target hydraulic pressure value ftp, the electric motor 23 of the hydraulic modulator 6 is controlled.

Thus, according to this processing, the increase or decrease quantity Δfas of the target hydraulic pressure value per unit time is always limited to a value of not larger than the predetermined value A, whereby an abrupt change of the hydraulic pressure (brake caliper pressure) generated by the hydraulic modulator 6 is suppressed.

Figure 3:
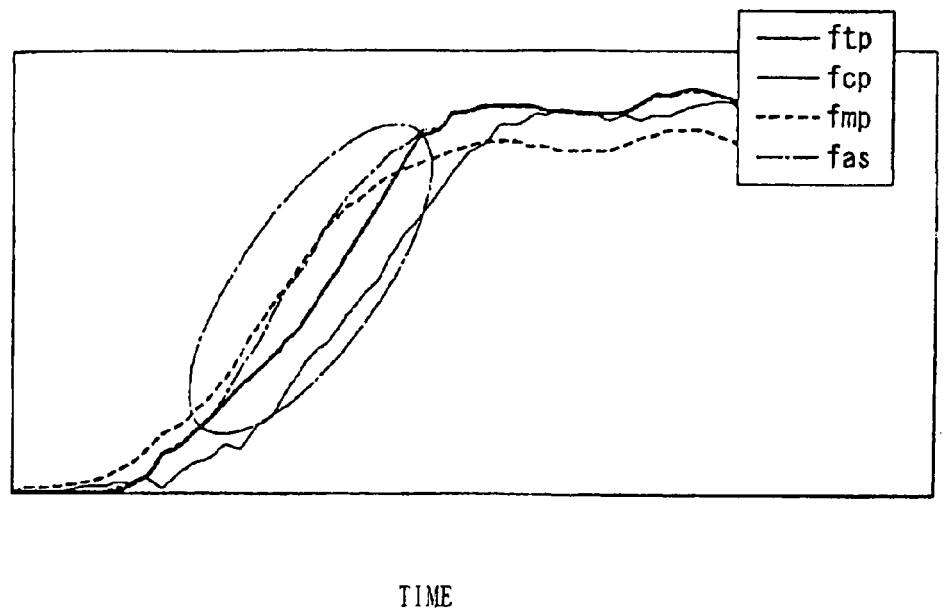
FIG. 3 is a characteristic diagram showing on the same time base a target hydraulic pressure ftp of a front wheel-side brake caliper, an actual hydraulic pressure fcp of the brake caliper, a hydraulic pressure fmp of a front wheel-side master cylinder and a target hydraulic pressure fas by basic calculation of the front wheel-side brake caliper according to the embodiment.

As is apparent from the characteristic diagram of FIG. 3, when the master cylinder pressure fmp rises, the temporary target hydraulic pressure value fas (the target hydraulic pressure value per unit time obtained by the basic calculation) also rises almost similarly. At this time, if the increase or decrease quantity Δfas of the temporary target hydraulic pressure value fas becomes not smaller than the predetermined value A, the normal target hydraulic pressure value ftp is corrected so that the increase or decrease quantity Δfas is fixed to the predetermined value A. Consequently, the rise of the brake caliper pressure fcp obtained by the hydraulic modulator 6 becomes gentle as a whole. According to this braking device, therefore, even under the situation where there is a large time lag from the time the input pressure of the master cylinder 3 is detected until the brake caliper pressure is actually controlled, it is possible to positively prevent the brake feeling from being deteriorated by a sudden increase of the braking force.

Figures 5, 6:
FIG. 5 is a map showing change speeds of a hydraulic pressure created by the hydraulic modulator which correspond to change quantities per unit time of the master cylinder according to a modification of the embodiment.
FIG. 6 is a characteristic diagram showing on the same time base a hydraulic pressure fmp of a front wheel-side master cylinder and an actual hydraulic pressure fcp of a front wheel-side brake caliper according to a comparative example wherein the correction of a target value is not performed.

FIG. 6 is a characteristic diagram of the braking device obtained when the target value is not corrected in accordance with an increase of the target hydraulic pressure value. As is seen from this characteristic diagram, if correction is not made, then if the difference between the master cylinder pressure fmp and the brake caliper pressure fcp becomes wider due to a sudden rise of the master cylinder pressure fmp, the brake caliper pressure fcp rises abruptly so as to compensate for the difference.

In the above embodiment, the difference between the master cylinder pressure fmp and the brake caliper pressure fcp is calculated accurately to determine the temporary target hydraulic pressure value fas (S101 to S103 in FIG. 4) and the change speed of the hydraulic pressure generated by the modulator 6 is limited in accordance with the increase or decrease quantity Δfas per unit time of the temporary target hydraulic pressure value fas. However, it is not always necessary to use the temporary target hydraulic pressure value fas insofar as the change speed of the hydraulic pressure generated by the hydraulic modulator 6 is limited by reflecting the change quantity per unit time in the input state detecting means (the input-side pressure sensor 28 in this embodiment).

But in this embodiment wherein the difference between the master cylinder pressure fmp and the brake caliper pressure fcp is calculated accurately by feedback of the detected value provided from the output-side pressure sensor 29 and the temporary target hydraulic pressure value fas taking the said difference into account is used, the change speed of the hydraulic pressure generated by the hydraulic modulator 6 can be limited with a high accuracy.

That is, since it is possible to minimize an unnecessary change speed limitation, it is possible to attain both an improvement in the brake feeling and a shortening of the braking distance.

Although in the above embodiment the change speed of the hydraulic pressure generated by the hydraulic modulator 6 is limited when the change quantity per unit time of the temporary target hydraulic pressure value fas has reached a certain predetermined value A or larger, the limitation may be made as in FIG. 5. That is, the change quantity per unit time of the master cylinder pressure fmp is divided into a plurality of regions (A1 to A4) and a change speed of the hydraulic pressure generated by the hydraulic modulator 6 is determined for each of the divided regions. Then the change speeds thus determined are stored in the form of Map 1 into the controller 20. Further, a change speed of the generated hydraulic pressure corresponding to the change quantity per unit time of the master cylinder pressure fmp is determined with reference to the Map 1 every time it is required.

In addition, upon arrival of the vehicle speed at the predetermined vehicle speed, the first electromagnetic opening/closing valve V1 closes, while the second electromagnetic opening/closing valve V2 opens, and the brake circuits 1a and 1b assume a stand-by state, so that, when the brake is not actuated. In this condition, it is possible to disconnect the master cylinder 3 from the hydraulic modulator 6 and the brake caliper 4 and maintain the master cylinder 3 and the hydraulic loss simulator 9 in communication with each other. As a result, the operational stroke of the brake operating portion 2 becomes stable when applying the brake and the feel of braking is improved thereby. In addition, the hydraulic pressure can be generated by the hydraulic modulator 6 as soon as there is a braking input. Thus, it is possible to obtain a stable braking performance.

Moreover, because the stand-by state is maintained by supplying an operational state holding current smaller than the rated electric current to the first and second electromagnetic opening/closing valves V1, V2, the power consumption can be greatly decreased in comparison with the case where the stand-by state is maintained by continuing the flow of the rated electric current. As a result, it is possible to prevent a lowering in the residual capacity of the battery.

Further, when there is a braking input in the stand-by state, the first and second electromagnetic opening/closing valves V1, V2 are kept closed and open, respectively, in a positive manner by supplying the rated electric current to both valves. Therefore, when the brake is actuated, it is possible to disconnect the master cylinder 3 from the hydraulic modulator 6 and the brake caliper 4 and maintain the master cylinder 3 and the hydraulic loss simulator 9 positively in communication with each other.

When the vehicle is stopped by a series of these operations and after the lapse of a certain time thereafter, a shift is made to a stop mode for stopping the operation of the hydraulic modulator 6 (electric motor 23).

In the stop mode, first the operation of the electric motor 23 is controlled in such a manner that the hydraulic pressure of the master cylinder 3 detected by the input-side pressure sensor 28 and the hydraulic pressure of the brake caliper 4 detected by the output-side pressure sensor 29 become almost equal to each other. When it is determined that the detected values obtained by the pressure sensors 28 and 29 are almost equal to each other, the third electromagnetic opening/closing valve V3 is de-energized and closed to cut off the communication between the hydraulic modulator 6 and the main brake passage 5 (the state shown in FIG. 7). Further, the first and second electromagnetic opening/closing valves V1, V2 are de-energized simultaneously with or just after the closing operation of the third electromagnetic opening/closing valve V3 (the state shown in FIG. 1). As a result, first the communication between the master cylinder 3 and the hydraulic loss simulator 9 is cut off by the closing operation of the second electromagnetic opening/closing valve V2 and at the same time the master cylinder 3 and the brake caliper 4 side of the main brake passage 5 come into communication with each other by the opening operation of the first electromagnetic opening/closing valve V1. As a result, the stroke on the master cylinder 3 side is retained as it is and the braking force is ensured by the hydraulic pressure of the brake caliper 4.

Thereafter, when the rider cancels the operation of the brake operating portion 2 with a consequent input of a brake release signal to the controller 20, the working fluid is returned to the master cylinder 3 from the brake caliper 4 side and at the same time the working fluid remaining in the hydraulic loss simulator 9 is returned to the master cylinder 3 through the bypass 15 and the check valve 16. Then, when the hydraulic pressure on the input side of the brake circuit 1a is at atmospheric pressure, the controller 20 makes a control to let the rated electric current flow in the third electromagnetic opening/closing valve V3 to open the valve and at the same time causes the electric motor 23 to operate, allowing the piston 18 located within the hydraulic modulator 6 to retreat up to its initial position, thereafter de-energizes the third electromagnetic opening/closing valve V3 to close the valve (the state shown in FIG. 1).

When the rider cancels the operation of the brake operating portion 2 before a stopping of the vehicle with a consequent input of a brake release signal to the controller 20, the controller 20 causes the electric motor 23 to operate, allowing the piston 18 located within the hydraulic modulator 6 to retreat up to its initial position to thereafter de-energizes the third electromagnetic opening/closing valve V3 to close the valve, thereby cutting off the communication between the hydraulic modulator 6 and the main brake passage 5 (the state shown in FIG. 7). Simultaneously with or just after the closing motion of the third electromagnetic opening/closing valve V3, the controller 20 de-energizes the first and second electromagnetic opening/closing valves V1, V2 temporarily to open the valve V1 and close the valve V2, allowing the brake caliper 4 and the master cylinder 3 to communicate with each other through the main brake passage 5, thereby allowing the hydraulic pressure in the brake caliper 4 to escape to the master cylinder 3 for release to the atmospheric pressure. Thus, it is possible to prevent drag of the brake pad when applying the brake.

When the hydraulic pressure on the input side of the brake circuit 1a is at atmospheric pressure, the controller 20 supplies the rated electric current to the first and second electromagnetic opening/closing valves V1, V2 to close the valve V1 and open the valve V2. Thereafter, the electric current flowing in the first and second electromagnetic opening/closing valves V1, V2 is decreased to the operational state holding current for return to the foregoing stand-by state.

A series of these operations, that is, the operations involving de-energizing the first and second electromagnetic opening/closing valves V1, V2 temporarily for a return of the hydraulic pressure of the brake caliper 4 to the atmospheric pressure, thereafter energizing the valves V1 and V2, further, decreasing the electric current flowing in both valves V1 and V2 down to the operational state holding current for return to the stand-by state, can be performed not only upon input of a brake release signal to the controller 20 (i.e., just after release of the brake) but also when the brake is not actuated, for example during acceleration or during travel at a constant speed while determining the degree of opening of the accelerator and the state of acceleration on the basis of detected values provided from a throttle sensor (not shown) and the wheel speed sensor 31.

If the timing of temporarily de-energizing the first and second electromagnetic opening/closing valves V1, V2 to let the hydraulic pressure of the brake caliper 4 returns to the atmospheric pressure and the timing of performing a braking operation in response to a braking input coincide with each other, the operational feeling becomes is deteriorated. To avoid this inconvenience, when a throttle return motion is detected by the throttle sensor, a control is made immediately for return to the stand-by state.

The present invention is not limited to the above embodiment, but various design changes may be made within the scope not departing from the gist of the invention. For example, although the motorcycle described in the above embodiments adopts both ABS and CBS, the present invention is also applicable to a motorcycle not adopting ABS and CBS.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A braking device for a motorcycle, comprising:
    a master cylinder interlocked with a brake operating portion;
    wheel braking means for imparting a braking force to a wheel with use of hydraulic pressure in the master cylinder;
    a brake passage for connecting the master cylinder with the wheel braking means;
    a hydraulic modulator for supplying a hydraulic pressure generated by an electric actuator to the wheel braking means through the brake passage; and
    a first electromagnetic opening/closing valve V1 of a normally open type disposed on the master cylinder side with respect to a connection of the brake passage with the hydraulic modulator;
    wherein, when applying the brake, the electric actuator is controlled in accordance with the amount of operation of the brake operating portion in a closed state of the first electromagnetic opening/closing valve V1 to supply a hydraulic pressure to the wheel braking means through the hydraulic modulator, and
    wherein the first electromagnetic opening/closing valve V1 is open when a main power supply is turned ON or until a vehicle speed reaches a predetermined vehicle speed, and after arrival of the vehicle speed at the predetermined vehicle speed, a rated electric current is supplied to the first electromagnetic opening/closing valve V1 to close the valve, thereafter, the electric current supplied to the first electromagnetic opening/closing valve V1 is decreased within a predetermined range that is able to maintain this state of operation,
    wherein the first electromagnetic opening/closing valve V1 is interposed in the brake passage, and
    a first section of the brake passage extends between and directly connects to an input side of the valve V1 to the master cylinder, and a second section of the brake passage extends between and directly connects to an output side of the valve V1 to the wheel braking means.

2. The braking device for a motorcycle according to claim 1, further comprising:
    input state detecting means for detecting the behavior of the brake operating portion; and
    hydraulic pressure control means for controlling hydraulic pressure created by the hydraulic modulator in accordance with a detected signal provided from the input state detecting means;
    wherein the hydraulic pressure control means includes change speed limiting means for limiting a change speed of the hydraulic pressure created by the hydraulic modulator in accordance with a change quantity per unit time of a detected value provided from the input state detecting means,
    and further comprising an output-side pressure sensor for detecting the hydraulic pressure of the wheel braking means.

3. The braking device for a motorcycle according to claim 2, wherein a signal provided from the input state detecting means for detecting a behavior of the brake operating portion and a signal provided from the output-side pressure sensor for detecting the hydraulic pressure of the wheel braking means are processed by a single controller.

4. The braking device for a motorcycle according to claim 2, wherein a signal provided from the input state detecting means for detecting a behavior of the brake operating portion and a signal provided from the output-side pressure sensor for detecting the hydraulic pressure of the wheel braking means are processed by a single controller, and
    wherein the first electromagnetic opening/closing valve V1 is adapted for making and breaking communication between the brake operating portion and the wheel braking means.

5. The braking device for a motorcycle according to claim 1, wherein when there is a braking input after the electric current supplied to the first electromagnetic opening/closing valve V1 has been decreased, the rated electric current is supplied to the first electromagnetic opening/closing valve V1.

6. The braking device for a motorcycle according to claim 1, and further comprising:
    a hydraulic loss simulator which, in accordance with the amount of operation of the brake operating portion, exerts a simulative hydraulic reaction force on the master cylinder through the brake passage located on the master cylinder side with respect to the first electromagnetic opening/closing valve V1; and
    a second electromagnetic opening/closing valve V2 of a normally closed type disposed between the brake passage and the hydraulic loss simulator, the second electromagnetic opening/closing valve V2 being opened when applying the brake;
    wherein when the main power supply is turned ON or until the vehicle speed reaches the predetermined vehicle speed, the first electromagnetic opening/closing valve V1 is open and the second electromagnetic opening/closing valve V2 is closed, and after arrival of the vehicle speed at the predetermined vehicle speed, the rated electric current is supplied to the first electromagnetic opening/closing valve V1 to close the valve and the rated electric current is supplied to the second electromagnetic opening/closing valve V2 to open the valve, thereafter, the electric current supplied to the first and second electromagnetic opening/closing valve V1, V2 is decreased within a range able to maintain this state of operation.

7. The braking device for a motorcycle according to claim 5, and further comprising:
   a hydraulic loss simulator which, in accordance with the amount of operation of the brake operating portion, exerts a simulative hydraulic reaction force on the master cylinder through the brake passage located on the master cylinder side with respect to the first electromagnetic opening/closing valve V1; and
   a second electromagnetic opening/closing valve V2 of a normally closed type disposed between the brake passage and the hydraulic loss simulator, the second electromagnetic opening/closing valve V2 being opened when applying the brake;
   wherein when the main power supply is turned ON or until the vehicle speed reaches the predetermined vehicle speed, the first electromagnetic opening/closing valve is opened and the second electromagnetic opening/closing valve V2 is closed, and after arrival of the vehicle speed at the predetermined vehicle speed, the rated electric current is supplied to the first electromagnetic opening/closing valve V1 to close the valve and the rated electric current is supplied to the second electromagnetic opening/closing valve to open the valve, thereafter, the electric current supplied to the first and second electromagnetic opening/closing valve V1, V2 is decreased within a range able to maintain this state of operation.

8. The braking device for a motorcycle according to claim 6, wherein when there is a braking input after the electric current supplied to the first and second electromagnetic opening/closing valves V1, V2 has been decreased, the rated electric current is supplied to the first and second electromagnetic opening/closing valves V1, V2.

9. The braking device for a motorcycle according to claim 7, wherein when there is a braking input after the electric current supplied to the first and second electromagnetic opening/closing valves V1, V2 has been decreased, the rated electric current is supplied to the first and second electromagnetic opening/closing valves V1, V2.

10. A braking device for a motorcycle, comprising:
    a master cylinder interlocked with a brake operating portion;
    wheel braking means for imparting a braking force to a wheel with use of hydraulic pressure in the master cylinder;
    a brake passage for connecting the master cylinder with the wheel braking means;
    a hydraulic modulator for supplying a hydraulic pressure generated by an electric actuator to the wheel braking means through the brake passage; and
    a first electromagnetic opening/closing valve V1 of a normally open type disposed on the master cylinder side with respect to a connection between the brake passage and the hydraulic modulator;
    wherein, when applying the brake, the electric actuator is controlled in accordance with the amount of operation of the brake operating portion in a closed state of the first electromagnetic opening/closing valve V1 to supply a hydraulic pressure to the wheel braking means through the hydraulic modulator; and
    wherein the first electromagnetic opening/closing valve V1 is open when a main power supply is turned ON or until a vehicle speed reaches a predetermined vehicle speed, the first electromagnetic opening/closing valve V1 is closed after arrival of the vehicle speed at the predetermined vehicle speed, and when there is a brake release input after the application of the brake in response to a braking input in this state, the first electromagnetic opening/closing valve V1 is opened temporarily at a predetermined timing when the brake is not actuated,
    wherein the first electromagnetic opening/closing valve V1 is interposed in the brake passage, a first section of the brake passage extends between and directly connects to an input side of the valve V1 to the master cylinder, and a second section of the brake passage extends between and directly connects to an output side of the valve V1 to the wheel braking means.

11. The braking device for a motorcycle according to claim 10, and further comprising:
    a hydraulic loss simulator which, in accordance with the amount of operation of the brake operating portion, exerts a simulative hydraulic reaction force on the master cylinder through the brake passage located on the master cylinder side with respect to the first electromagnetic opening/closing valve V1; and
    a second electromagnetic opening/closing valve V2 of a normally closed type disposed between the brake passage and the hydraulic loss simulator, the second electromagnetic opening/closing valve V2 being opened when applying the brake;
    wherein, when the main power supply is turned ON or until the vehicle speed reaches the predetermined vehicle speed, the first electromagnetic opening/closing valve V1 is open and the second electromagnetic opening/closing valve V2 is closed, then after arrival of the vehicle speed at the predetermined vehicle speed, the first electromagnetic opening/closing valve V1 is closed and the second electromagnetic opening/closing valve V2 is opened, and when there is a brake release input after the application of the brake in response to a braking input in this state, the first electromagnetic opening/closing valve V1 is open and the second electromagnetic opening/closing valve V2 is closed temporarily at a predetermined timing when the brake is not actuated.

12. The braking device for a motorcycle according to claim 1, and further comprising a third electromagnetic opening/closing valve V3 of a normally closed type disposed between the brake passage and the hydraulic modulator and adapted to open only when there is a braking input.

13. The braking device for a motorcycle according to claim 5, and further comprising a third electromagnetic opening/closing valve V3 of a normally closed type disposed between the brake passage and the hydraulic modulator and adapted to open only when there is a braking input.

14. The braking device for a motorcycle according to claim 6, and further comprising a third electromagnetic opening/closing valve V3 of a normally closed type disposed between the brake passage and the hydraulic modulator and adapted to open only when there is a braking input.

15. The braking device for a motorcycle according to claim 7, and further comprising a third electromagnetic opening/closing valve V3 of a normally closed type disposed between the brake passage and the hydraulic modulator and adapted to open only when there is a braking input.

16. The braking device for a motorcycle according to claim 8, and further comprising a third electromagnetic opening/closing valve V3 of a normally closed type disposed between the brake passage and the hydraulic modulator and adapted to open only when there is a braking input.

17. The braking device for a motorcycle according to claim 9, and further comprising a third electromagnetic opening/closing valve V3 of a normally closed type disposed between the brake passage and the hydraulic modulator and adapted to open only when there is a braking input.

18. The braking device for a motorcycle according to claim 10, and further comprising a third electromagnetic opening/closing valve V3 of a normally closed type disposed between the brake passage and the hydraulic modulator and adapted to open only when there is a braking input.

19. The braking device for a motorcycle according to claim 11, and further comprising a third electromagnetic opening/closing valve V3 of a normally closed type disposed between the brake passage and the hydraulic modulator and adapted to open only when there is a braking input.

20. The braking device for a motorcycle according to claim 10, further comprising:
    input state detecting means for detecting the behavior of the brake operating portion; and
    hydraulic pressure control means for controlling hydraulic pressure created by the hydraulic modulator in accordance with a detected signal provided from the input state detecting means;
    wherein the hydraulic pressure control means includes change speed limiting means for limiting a change speed of the hydraulic pressure created by the hydraulic modulator in accordance with a change quantity per unit time of a detected value provided from the input state detecting means,
    and further comprising an output-side pressure sensor for detecting the hydraulic pressure of the wheel braking means.

21. The braking device for a motorcycle according to claim 20, wherein a signal provided from the input state detecting means for detecting a behavior of the brake operating portion and a signal provided from the output-side pressure sensor for detecting the hydraulic pressure of the wheel braking means are processed by a single controller.

22. The braking device for a motorcycle according to claim 20, wherein a signal provided from the input state detecting means for detecting a behavior of the brake operating portion and a signal provided from the output-side pressure sensor for detecting the hydraulic pressure of the wheel braking means are processed by a single controller, and
    wherein the first electromagnetic opening/closing valve V1 is adapted for making and breaking communication between the brake operating portion and the wheel braking means.

* * * * *